US008953437B1

(12) United States Patent
Tiruveedhula

(10) Patent No.: US 8,953,437 B1
(45) Date of Patent: Feb. 10, 2015

(54) GRACEFUL RESTART FOR LABEL DISTRIBUTION PROTOCOL DOWNSTREAM ON DEMAND

(75) Inventor: Maruthi Kishore Tiruveedhula, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 356 days.

(21) Appl. No.: 13/343,534

(22) Filed: Jan. 4, 2012

(51) Int. Cl.
*G01R 31/08* (2006.01)
*H04L 12/28* (2006.01)

(52) U.S. Cl.
USPC .......................................... 370/218; 370/389

(58) Field of Classification Search
CPC ......... H04L 45/22; H04L 45/26; H04L 45/28; H04L 45/50; H04L 41/0654
See application file for complete search history.

(56) References Cited

U.S. PATENT DOCUMENTS

| 2003/0067871 | A1* | 4/2003 | Busi et al. ...................... 370/222 |
| 2007/0174483 | A1* | 7/2007 | Raj et al. ....................... 709/238 |
| 2008/0192762 | A1* | 8/2008 | Kompella et al. ............. 370/410 |
| 2011/0058567 | A1* | 3/2011 | Wijnands et al. ............. 370/401 |

OTHER PUBLICATIONS

Thomas et al., "LDP DoD Graceful Restart," draft-thomas-mpls-ldp-dod-restart-00.txt, Feb. 2003, 21 pp.
Andersson et al., "LDP Specification," RFC 3036, Jan. 2001, 133 pp.
Leelanivas et al., "Graceful Restart Mechanism for Label Distribution Protocol," RFC 3478, Feb. 2003, 13 pp.
Farrel, "Fault Tolerance for the Label Distribution Protocol (LDP)," RFC 3479, Feb. 2003, 53 pp.
Andersson et al., "LDP Specification," RFC 5036, Oct. 2007, 136 pp.
Awduche et al., "RSVP-TE: Extensions to RSVP for LSP Tunnels," RFC 3209, Dec. 2001, 61 pp.

* cited by examiner

*Primary Examiner* — Jutai Kao
(74) *Attorney, Agent, or Firm* — Shumaker & Sieffert, P.A.

(57) ABSTRACT

In general, techniques are described for performing a graceful restart for a computing network utilizing downstream on demand (DOD) label distribution. In one example, a method is provided that includes establishing a communication session for Label Distribution Protocol (LDP) that uses a downstream on demand label distribution mechanism for distributing labels. A first label mapping message is exchanged between two routers that defines at least a first label to be applied by an upstream router when forwarding one or more of the data packets to a destination. When the communication session fails, a forwarding state comprising the first label is preserved, and one or more data packets are forwarded based on the first label. The communication session is gracefully restarted. Once the communication session is reestablished, a second label mapping message is exchanged between the routers.

14 Claims, 5 Drawing Sheets

GRACEFUL RESTART FOR LABEL DISTRIBUTION PROTOCOL DOWNSTREAM ON DEMAND

TECHNICAL FIELD

The invention relates to computer networks and, more specifically, to techniques to reduce traffic loss in the event a network device incurs a failure.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device along a given route. Upon receiving an incoming packet, the router examines information within the packet to identify the destination for the packet. Based on the destination, the router forwards the packet in accordance with the forwarding information.

Some computer networks, such as the Internet, an administrative domain or network, often include many routers that exchange routing information according to a defined routing protocol. Examples of the defined routing protocol may include, among others, the Border Gateway Protocol (BGP), the Intermediate System to Intermediate System (IS-IS) Protocol, and the Open Shortest Path First (OSPF) Protocol. When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to inform that some routes are no longer available.

A computer network utilizing a multiprotocol label switching (MPLS) mechanism directs data packets between network nodes based on labels affixed to the front of the packets. The MPLS architecture defines a protocol for distributing labels as a set of procedures by which one Label Switched Router (LSR) informs another of the meaning of labels used to forward traffic between and through the routers. Data packets sent over a MPLS network typically include a label stack of one or more labels, where the labels are associated with paths between network devices in the computer network, such as nodes or routers. A path through the computer network may be referred to as a Label Switched Path (LSP). A signaling protocol, such as a label distribution protocol (LDP), is used by the routers to exchange the labels.

A MPLS network may include one or more LSRs, nodes, and end point devices (e.g., servers, printers, and computers). Each LSR within the MPLS network typically forwards packets by performing label swapping. That is, as MPLS packets are forwarded within the MPLS network, each LSR along the path to the destination typically performs label swapping to replace one or more labels in the label stack of each data packet with a new label and forward the data packet according to the new label. For example, an intermediate LSR along the path may identify the next downstream LSR to which to forward the data packet based on an outer label in the label stack of the data packet. The LSR typically pops the outer label and replaces the label with a new label advertised by the downstream LSR and forwards the data packet to the downstream LSR. The receiving router forwards the data packet based on the new label.

In the event of a routing communication session failure from a failed router, i.e., the session faults or "goes down," the surviving router may select one or more alternative routes through the computer network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information may propagate outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity, increased packet loss, and latency.

As one technique for reducing the impact of failures, the failed router may support "non-stop forwarding," which refers to the ability to continue forwarding packets while the routing session is reestablished. Redundant components in the failed router maintain forwarding state information during control module failure, enabling the failed router to continue forwarding packets over routes that were available in the network's last-known state. Concurrently, the failed router relearns the network topology and recalculates its routing information and forwarding information. As a result, impact on current packet flows through the network is reduced.

Moreover, some routers support "graceful restart," which refers to the capability of preserving forwarding information while restarting a routing communication session with a peer router. When establishing a routing communication session, a router that supports graceful restart may advertise the capability to the peer router and may specify a restart time. The restart time is the estimated time for the router to reestablish the routing communication session after failure of the previous session. Upon failure of the routing communication session, the surviving router preserves forwarding information based on the expectation that the failed router will reestablish the routing communication session shortly. In other words, the surviving router will maintain the failed router within a forwarding path of the surviving router in the event of a failure of the routing communication session. Likewise, the failed router preserves forwarding information in a state that existed prior to the failure. Consequently, the surviving router does not need to find alternative routes unless the failed router does not reestablish the routing communication session within the advertised restart time. As a result, the routing instability caused by routing flaps within the network may be reduced.

SUMMARY

In general, techniques are described for reducing the impact of failure of a network device. In particular, techniques are described for performing a graceful restart for a multiprotocol label switching (MPLS) computer network that utilizes labels according to a label distribution protocol. Graceful restart may reduce the impact of a failure a routing communication session, which may be due to a failure of one or more network devices within the MPLS network. In some examples, the label distribution routing protocol is the Label Distribution Protocol (LDP) specified in "LDP Specification," RFC5036, The Internet Society (2007), the entire contents of which is incorporated herein by reference. Techniques described herein may enable a graceful restart of a routing communication session for LDP that operates using downstream on demand label distribution where an LSR can distribute a FEC label binding in response to an explicit request from another LSR.

Graceful restart may allow for the forwarding of data packets to continue along known routes while the routing communication session is restored. Once the routing communication session is reestablished, MPLS routing information may be restored. For example, a new label mapping may be determined by the downstream router in response to the communication session for LDP being reestablished. A label mapping may identify labels for other network devices connected to the downstream router. In some examples, the label mapping may define at least one hop of a path for routing one or more data packets to an end node of the network. In a downstream on demand communication session, an upstream router requests labels from a downstream router. The downstream router provides the labels or information related to the labels in a label mapping message.

As described herein, the response of a network device to a communication session failure may be based upon a particular location of the network device in the topology of the network. For example, in the event of a communication session failure, which may be caused by a failure of at least one of an upstream router and a downstream router, the upstream router may send a label request message to the downstream router in a network that supports graceful restart. The label request message sent by the upstream router may be a re-request for the label mapping from a neighboring, downstream router. For example, if the downstream router fails, the upstream router may mark the current labels as stale in a forwarding plane of the upstream router. The upstream router may continue to forward data packets according to the stale labels. Once the upstream router receives new labels from the downstream router, the upstream router updates the new labels in the forwarding plane and proceeds with forwarding data packets according to the new labels.

In one example, a method comprises establishing a communication session for a Label Distribution Protocol (LDP) between an upstream router and a downstream router, wherein the communication session is using a downstream on demand label distribution mechanism for distributing labels between routers. The method also comprises requesting, by the upstream router, a first label mapping from the downstream router, wherein the downstream router is downstream of the upstream router with respect to a destination of a plurality of data packets. The method includes the upstream router receiving the first label mapping message from the downstream router via the communication session, wherein the first label mapping message includes at least a first label to be applied by the upstream router when forwarding at least a first data packet of the plurality of data packets to the destination. The example method also includes detecting a failure of the communication session and forwarding, by the upstream router, at least a first data packet of the plurality of data packets according to at least the first label while the communication session is failed. The method further comprises reestablishing the communication session for LDP between the upstream router and the downstream router while preserving a forwarding state for at least the first label. The method also comprises requesting, by the upstream router, a second label mapping message from the downstream router via the reestablished communication session, wherein the second label mapping message includes at least a second label to be applied by the upstream router when forwarding at least a second data packet of the plurality of data packets to the destination in the reestablished communication session.

In another example, a network device comprises an interface card, a routing control unit, and a forwarding unit. The routing control unit includes one or more processors that establishes a routing communication session with a peer label switching router (LSR) in accordance with a routing protocol, wherein the routing communication session that uses a downstream on demand label distribution mechanism for distributing labels between routers, wherein the peer LSR is downstream of the network device with respect to a label switching path of a plurality of data packets, and wherein the routing control unit is configured to receive a first label mapping message comprising at least a first label to be applied by the network device when forwarding at least a first data packet of the plurality of data packets to a destination, detect a failure of the routing communication session, reestablish the routing communication session between the network device and the peer LSR while preserving a forwarding state for at least the first label, send a label request to the peer LSR requesting a label mapping message responsive to the detected failure, and receive a second label mapping message comprising at least a second label to be applied by the network device when forwarding at least a second data packet of the plurality of data packets to the destination. The forwarding unit preserves the forwarding state of the first label while the routing communication session is failed, and forwards at least the first data packet according to the first label while the routing communication session is failed and forwards any remaining data packets of the plurality of data packets according to the second label once the routing communication session is reestablished.

In another example, a network device includes a first interface card that connects to a first label switching router (LSR) over a first communication session for a label distribution protocol (LDP) that distributes a first set of labels between the network device and the first LSR, wherein the first LSR is upstream of the network device with respect to a label switching path. The network device includes a second interface card that connects to a second LSR over a second communication session for LDP that distributes a second set of labels between the network device and the second LSR, wherein the second LSR is downstream of the network device with respect to the label switching path, wherein at least one of the first communication session and second communication session uses a downstream on demand label distribution mechanism. The network device further includes a routing control unit and a forwarding unit. The routing control unit includes one or more processors and is configured to detect a failure of at least one of the first communication session for LDP and the second communication session for LDP, to reestablish the failed communication session while preserving a forwarding state for at least the set of labels corresponding to the failed communication session, to receive a label request message from the first LSR, and to send a label mapping message to the first LSR responsive to receiving the label request message from the first LSR. The forwarding unit forwards at least one data packet of a plurality of data packets according to a first label mapping while the routing communication session is failed, and forwards any remaining data packets of the plurality of data packets according to a second label mapping once the failed routing communication session is reestablished.

In yet another example, a network device includes a first interface card that connects to a label switching router (LSR) over a communication session for a label distribution protocol (LDP), wherein the communication session uses a downstream on demand label distribution mechanism for distributing labels between the network device and the LSR, wherein the LSR is upstream of the network device with respect to a label switching path. The network device includes a second interface card that connects to a node, wherein the node is downstream of the network device with respect to the label switching path. The network device further includes a routing control unit and a forwarding unit. The routing control unit has one or more processors and is configured to detect a failure of the communication session for LDP, reestablish the communication session for LDP between the LSR and the network device while preserving a forwarding state for at least the first label, and send a label mapping message to the LSR in response to receiving a label mapping request from the LSR, wherein the label mapping message comprises at least one label to be applied by the LSR when forwarding at least a first data packet of the plurality of data packets to the node. The forwarding unit forwards at least one data packet of a plurality of data packets according to a first label mapping while the routing communication session is failed according to the preserved forwarding state, and forwards any remaining data packets of the plurality of data packets according to a second label mapping once the failed routing communication session is reestablished.

In another example, a tangible non-transitory computer-readable medium comprising instructions for causing a programmable processor to perform operations is disclosed. The instructions include establishing a communication session for a Label Distribution Protocol (LDP) between an upstream router and a downstream router, wherein the communication session is using a downstream on demand label distribution mechanism for distributing labels between the upstream router and the downstream router. The instructions include requesting, by the upstream router, a first label mapping from the downstream router, wherein the downstream router is downstream of the upstream router with respect to a destination of a plurality of data packets. The instructions further include receiving, by the upstream router, the first label mapping message from the downstream router via the communication session, wherein the first label mapping message includes at least a first label to be applied by the upstream router when forwarding at least a first data packet of the plurality of data packets to the destination and detecting a failure of the communication session. The instructions further include forwarding, by the upstream router, at least a first data packet of the plurality of data packets according to at least the first label while the communication session is failed. The instructions include reestablishing the communication session for LDP between the upstream router and the downstream router while preserving a forwarding state for at least the first label. The instructions also include requesting, by the upstream router, a second label mapping message from the downstream router via the reestablished communication session, wherein the second label mapping message includes at least a second label to be applied by the upstream router when forwarding at least a second data packet of the plurality of data packets to the destination in the reestablished communication session.

Techniques disclosed herein may reduce the amount of traffic lost during a failure of a network device. Particularly, techniques disclosed herein allow for graceful restart of a computer network engaged in a downstream on demand communication session. In this manner, there may be a reduced restart time for the computer network utilizing a downstream on demand communication session.

The details of one or more examples are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present invention. Like reference characters denote like elements throughout the figures and text.

DETAILED DESCRIPTION

Figure 1:
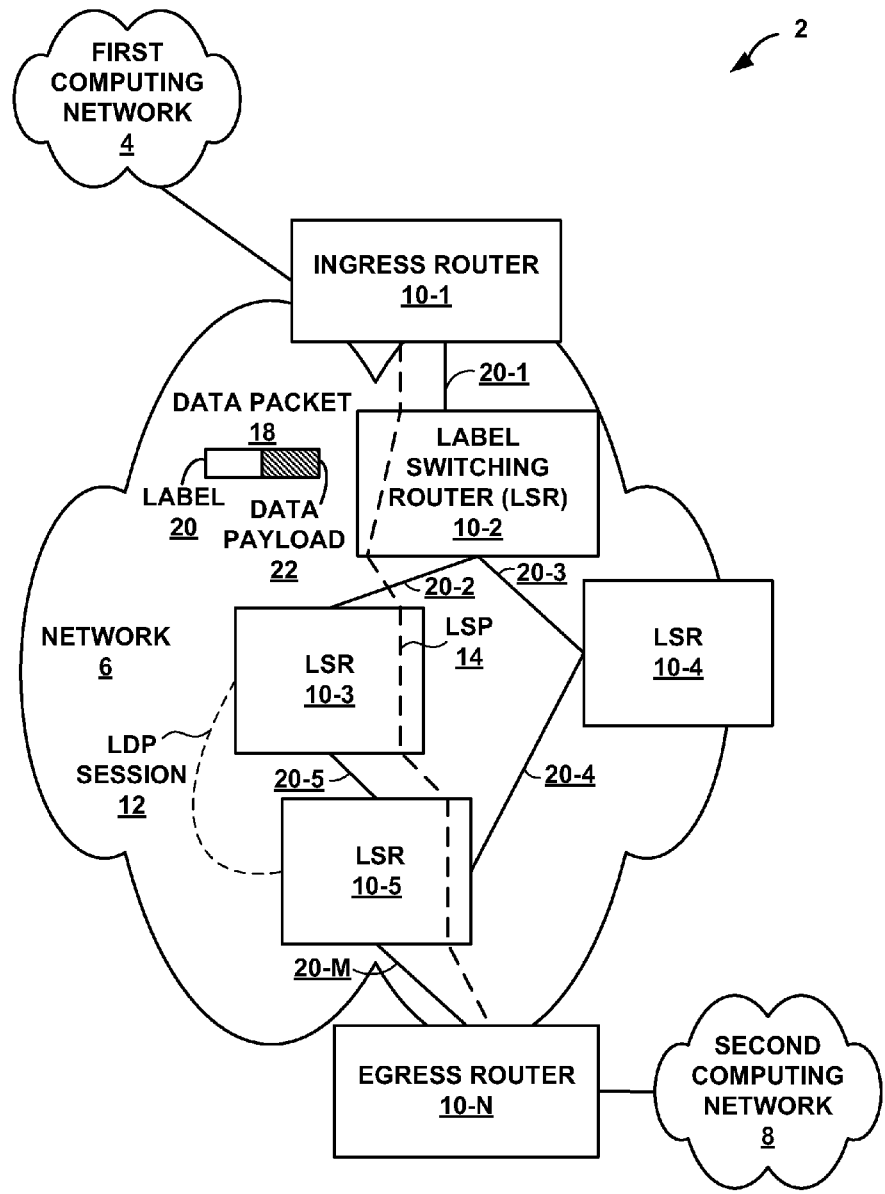
FIG. 1 is a block diagram illustrating an example computer network in which network devices reestablish a routing communication session upon failure of a network device, in accordance with techniques described herein.

FIG. 1 is a block diagram illustrating an example computer network 2 in which network devices reestablish a routing LDP session 12 upon failure of a network device, in accordance with techniques described herein. The network devices may be one or more routers, such as ingress router 10-1, transit routers 10-2 through 20-5, and egress router 10-N, collectively referred to as "routers 10," wherein N is a natural number correlated with a number of routers in computer network 2. N may be any number of routers 10 that computer network 2 can support. In the example of FIG. 1, LSR 10-5 supports graceful restart, which allows for the forwarding of data packets to continue along known routes while routing LDP session 12 is restored. FIG. 1 is just one example of a computer network 2 that supports graceful restart, and is not meant to be limiting.

As shown in FIG. 1, computer network 2 comprises a network between a first computing network 4, label switching routers (LSRs) 10, and a second computing network 8. A network 6 comprises one or more LSRs 10. LSR 10 are devices that forward one or more data packets between first computing network 4 and second computing network 8. An LSR 10 is a router that forwards a data packet according to a label in a header of the data packet, and replaces, or switches, the label with a new label based on a label mapping. Each LSR 10 is connected to at least one other LSR 10 through one or more data links 20-1 through 20-M (referred to collectively as "data links 20"). For example, ingress router 10-1 is connected to LSR 10-2 over data link 20-1. Similarly, router 10-2 is connected to LSPs 10-3 and 10-4 with data links 20-2 and 20-3, respectively. Data links 20 may be wired or wireless network connections.

Network 6 comprises ingress router 10-1, which serves as an ingress point (and, in some cases, an egress point) between first computing network 4 and network 6. Network 6 also comprises egress router 10-N. Egress router 10-N serves as a router to forward data packets from network 6 to second computing network 8. In some examples, one or both of ingress router 10-1 and egress router 10-N are label switching routers (LSRs). Network 6 comprises one or more transit LSRs. For illustrative purposes only, FIG. 1 depicts network 6 as comprising four transit LSRs, LSRs 10-2 through 10-5. In other examples, network 6 comprises other numbers of routers, including multiple ingress and egress routers.

FIG. 1 is discussed in terms of computer network 2 being a multiprotocol label switching (MPLS) network that supports a protocol for distributing labels. However, in other examples, computer network 2 may be another type of network and may route data according to other protocols. For the purposes of this example, MPLS computer network 2 uses label distribution, such as the label distribution protocol (LDP). The LDP is a protocol for distributing labels that defines a set of procedures and messages by which label switched routers 10 forward traffic along label switched paths (LSPs), such as label switched path 14, through computer network 2 by mapping network-layer routing information, such as labels, directly to data-link layer switched paths.

Data packet sent over the MPLS computer network 2 is associated with labels that identify paths between LSRs 10. The paths are referred to herein as label switching paths (LSPs). The label distribution protocol (LDP) is used to distribute labels associated with a Forwarding Equivalence Class (FEC). A FEC may be a particular destination address, where labels mapped to the FEC are used within network 6 to control forwarding of packets along an LSP to that destination. In this way, a FEC associated with an LSP controls which data packets are "mapped" to that LSP. That is, a FEC specification for each LSP defines which data packets are mapped to the LSP. LSPs are extended through a network as each LSR "splices" incoming labels for a FEC to the outgoing label assigned to the next hop for the given FEC. In some examples, LSRs 10 utilize LDP for distributing labels and utilize other routing protocols, such as an interior gateway protocol (IGP), for routing functions and routing-based decisions. As such, LDP can be utilized for setting up LSPs for FECS representing destination addresses, such as network address of egress router 10N or second computing network 8. Relative to a particular label switching router, an LSP may have an endpoint at a directly attached neighbor or may have an endpoint at a network egress node, enabling switching via all intermediary transit nodes. In the example of FIG. 1, routers 10 utilize LDP messages to advertise labels associated with particular FECs. The LDP messages utilize a structure that uses a Type-Length-Value (TLV) encoding scheme as defined in "LDP Specification," RFC3036, The Internet Society (2001), the entire contents of which are incorporated herein by reference. Additional details may be found in Ina Minei and Julian Lucek, "MPLS-Enabled Applications," pp. 1-36, Wiley and Sons, Ltd, 2005, the entire contents of which are incorporated herein by reference.

An LSP 14 is shown in FIG. 1, defining a path through network 6. A data packet 18 comprises a label 20 and a data payload 22. In some examples, label 20 is provided in a header of data packet 18. In this example, label 20 is associated an LSP 14 that defines a path through network 6. Label 20 identifies a LSR or a destination node to which data packet 18 may be forwarded, such as second computing network 8. Label 20 identifies LSP 14 as the path data packet 18 is to follow through network 6.

As shown in FIG. 1, ingress router 10-1 forwards data packet 18 along LSP 14 to LSR 10-2 according to label 20. LSR 10-2 reads label 20 and determines which LSR 10 to forward data packet 18 to based on label 20. That is, when router 10-2 receives data packet 18, router 10-2 reads keying information in data packet 18, i.e., label 20, to identify a FEC associated with the label to control forwarding of data packet 18. At this time, using information in a routing table or a routing policy, LSR 10-2 swaps label 20 with a label advertised by LSR 10-3 for the particular FEC. That is, LSR 10-2 may replace an old label, such as label 20 of data packet 18, with a new label received via LDP for the particular FEC. LSR 10-2 forwards data packet 18 according to the new label. That is, the LSR 10 performs routing functions for the FEC to select a downstream LSR 10 to which to forward data packet 18, swaps label 20 with the appropriate label advertised by the selected LSR for the FEC and forwards data packet 18 to the selected LSR 10. For example, LSR 10-2 may have previously received a set of labels from an LDP label mapping message sent from a router downstream of LSR 10-2, such as LSR 10-3, with respect to forwarding MPLS packets to egress router 10-N or destination 8. LSR 10-2 replaces the previous, old label in the data packet with a new label from the label mapping message.

In this way, data packet 18 is forwarded from one LSR 10 to another LSR 10 through network 6 until data packet 18 reaches its destination node, such as second computing network 8. For example, as described, LSR 10-2 determines that data packet 18 is to be forwarded to LSR 10-3 based on label 20. Thus, LSR 10-2 performs label swapping and forwards data packet 18 to LSR 10-3. In turn, following similar procedures as LSR 10-2, LSR 10-3 replaces the new label with yet another label and forwards data packet 18 to LSR 10-5. Likewise, LSR 10-5 forwards data packet 18 to egress router 10-N. In turn, egress router 10-N provides data packet 18 to computing network 8.

As used herein, two LSRs 10 which use LDP to exchange at least one of labels and FEC mapping information are known as "LDP peers" with respect to that information. As such, as used herein, two LDP peers may have an "LDP session" between them for communicating labels and FEC mapping information that associates each label with a FEC. For example, LDP peers LSR 10-3 and LSR 10-5 have an LDP session 12. LDP session 12 allows each peer, LSR 10-3 and LSR 10-5, to learn the other's label mappings. This is because the label distribution protocol is bi-directional. An LDP session may also be referred to herein as a "communication session" or a "communication session for a Label Distribution Protocol (LDP)."

As used herein, a device that transmits a labeled data packet is considered "upstream," and a device that receives that labeled packet is considered "downstream." Thus, the flow of data along an LSP is from upstream to downstream. For example, data packet 18 following path 14 is transmitted by LSR 10-3 to LSR 10-5 in LDP session 12. Therefore, LSR 10-3 is an upstream router to LSR 10-5 with respect to data packet 18. Similarly, LSR 10-5 is a downstream router to LSR 10-3 with respect to data packet 18.

In this example, each LSR 10 supports graceful restart, which may also be referred to as non-stop forwarding (NSF). As used herein, graceful restart is a capability of preserving forwarding information while restarting a routing communication session, such as LDP session 12. In some examples, each LSR 10 also supports non-stop routing (NSR) as well as graceful restart. Non-stop routing may be a routing protocol operating mode that maintains neighbor relationships between LSRs 10. NSR may allow for relevant routing information to be transferred to LSRs 10 during a device failure.

Each LSR 10 that supports graceful restart may announce its ability to perform a graceful restart to a neighbor router, such as an LDP peer. For example, if LSR 10-3 is capable of performing a graceful restart, LSR 10-3 provides a message to neighbor routers 10-2, 10-4, and 10-5 indicating LSR 10-3 supports graceful restart. Each LSR 10 may also be able to detect when another LSR 10 has failed. Based on a detected failure of a LDP peer, an LSR 10 can take an action, including, for example, starting a recovery timer.

For purposes of illustration, some of the techniques of the disclosure will be described in terms of a routing communication session for LDP, such as LDP session 12 between LSR 10-3 and LSR 10-5. Initially, LSR 10-3 establishes LDP session 12 with LSR 10-5 via which they exchange information in accordance with a defined routing protocol, such as Label Distribution Protocol (LDP). In some examples, LDP session 12 comprises smaller communication sessions between neighboring devices. When establishing LDP session 12, LSRs 10-3 and 10-5 exchange information that indicates routing protocol capabilities supported by each of LSRs 10-3 and 10-5. For example, LSR 10-3 advertises support of graceful restart to LSR 10-5. This informs LSR 10-5 that in the event LDP session 12 goes down, LSR 10-3 is to maintain LSR 10-5 within its forwarding path until either LDP session 12 is reestablished or a restart time elapses.

Although for purposes of example, graceful restart techniques for reestablishing routing communication sessions with reduced restart times are described herein with reference to LDP, the techniques may be applied by other protocols that distribute labels, such as Resource Reservation Protocol (RSVP). Also, the techniques are described in terms dynamically renegotiating a restart time associated with LDP session 12 between LSR 10-3 and LSR 10-5 upon failure of a control unit of one of the LSRs 10-3 or 10-5. However, the techniques described herein are applicable to graceful restart associated with routing communication sessions between any peer LSRs 10 that support graceful restart.

In some examples, LDP session 12 fails due to an error of a router, such as LSR 10-3 or 10-5. While reestablishing session 12, the non-failed router preserves forwarding information in a forwarding state that existed prior to the failure of the failed router. In some examples, a control unit of a router fails, but as a forwarding plane of the router is still operational, the failed router continues to forward data packets while the control unit is down. In this example, LSRs 10-3 and 10-5 continue to forward network traffic in accordance with the preserved forwarding information. Further, LSR 10-3 continues to forward network traffic to LSR 10-5 based on the expectation that LDP session 12 will be reestablished shortly. Upon restart of the failed router, the LSRs 10-1 and 10-2 reestablish LDP session 12. LSR 10-3 communicates restart information to LSP 10-5 or LSR 10-5 communicates restart information to LSP 10-3.

Each graceful restart capable LSP 10 preserves internal forwarding information while restarting a failed LDP session, for example, a downstream on demand (DOD) session following the Label Distribution Protocol (LDP). In other words, in the event of a session failure, each graceful restart capable LSP 10 preserves the forwarding information in a state that existed prior to failure while reestablishing the routing LDP session.

The Label Distribution Protocol defines at least two ways for a label mapping to be requested, Downstream Unsolicited (DU) and Downstream On Demand (DOD). In DU, an LSR 10 is capable of distributing label bindings to LSRs that have not explicitly requested them. Further details for graceful restart procedures for downstream unsolicited label distribution are described in "Graceful Restart Mechanism for Label Distribution Protocol," RFC3478, The Internet Society (2003), the entire contents of which are incorporated herein by reference. In DOD, an LSR 10 is capable of distributing a FEC label mapping in response to an explicit request for a label mapping from another LSR 10.

As described herein, the label switching routers support graceful restart of a label distribution protocol communication session when downstream on demand mechanisms are employed. When the communication session fails, a forwarding state that contains labels distributed before the communication session failure may be preserved. The LSRs continue to forward data packets based on the preserved forwarding state while the communication session is down or being reestablished. Once the LDP communication session is reestablished, an upstream router may employ DOD capabilities and request a label mapping message from a downstream router.

For example, in a label distribution protocol communication session using downstream on demand mechanisms, an upstream router, such as LSR 10-3, sends a label mapping request to a downstream router, such as LSR 10-5. The label request message specifies a FEC. In some examples, other attributes may be included in the label request message, such as a hop count or a path vector. LSR 10-5 responds to the label mapping request by sending LSR 10-3 a label mapping message that includes labels for the FEC specified in the label request message.

When to request a label or advertise a label mapping to a peer LSR is largely a local decision made by each LSR 10. In general, a first LSR 10 may request a label mapping from a second LSR 10, neighboring the first LSR 10, when a label mapping is needed. Similarly, the first LSR 10 may advertise a label mapping to a neighboring LSR when it wishes the second LSR to use a label. In other examples, an LSR 10 may request a label mapping or advertise a label mapping based on an event, such as receiving a data packet. In other examples, other events or instructions may trigger an LSR 10 to send a label mapping request or a label mapping message.

A particular response of a router in performing a graceful restart is based on a number of factors. These factors may include a position of the router in the topology of the network. For example, a response of transit LSR 10-2 to a failure of a neighboring device, such as transit LSR 10-3, may differ from the response of ingress router 10-1 to a failure of transit LSR 10-2. Similarly, a response of a router varies depending on which neighboring router fails. Furthermore, another factor that may influence the response of a surviving router in performing a graceful restart is the characteristics of the LDP session between the surviving router and the failing router. For example, transit router 10-2 responds differently when a neighboring device, such as router 10-3, fails when an LDP session between ingress router 10-1 and transit router 10-2 is a downstream on demand LDP session than when the LDP session is a downstream unsolicited LDP session. Several examples of these different factors will be described in detail below with respect to FIGS. 3A-3G.

The techniques described herein provide a simple approach for providing graceful restart for a communication session having LDP and employing a downstream on demand mechanism. The techniques described herein may provide certain advantages, such as preserving LDP mechanisms while an LDP communication session is down, and non-stop forwarding. Graceful restart reduces problems associated with routing flaps, such as intermittent loss of network connectivity as well as increased packet loss and latency. The approaches described herein maintain compatibility, including backwards compatibility, with LDP procedures and does not require an additional label TLV. Furthermore, because the techniques do not require an additional label TLV, no protocol extensions are required to add to the Label Distribution Protocol. The approach also interoperates with existing downstream unsolicited graceful restart procedures.

Figure 2:
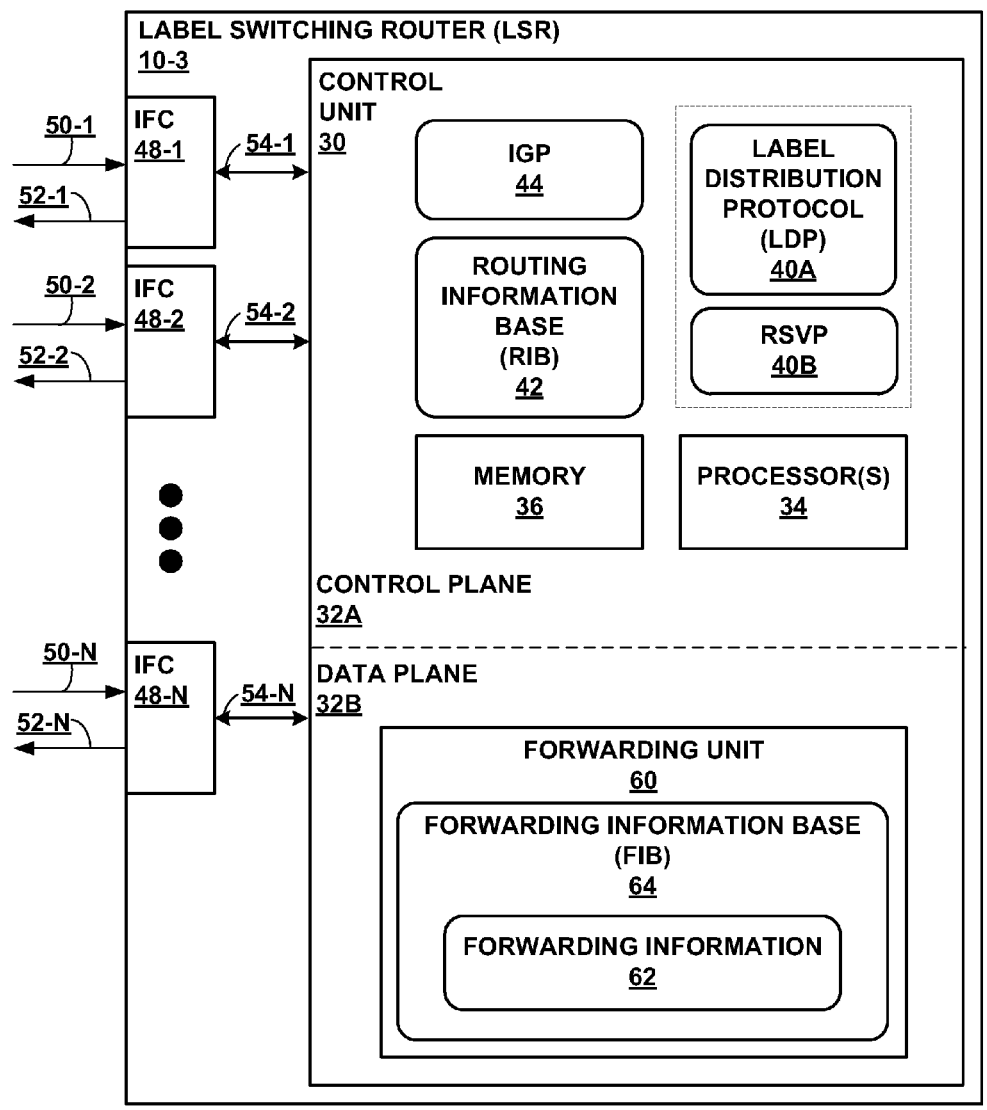
FIG. 2 is a block diagram illustrating one exemplary embodiment of a label switching router (LSR) that performs a graceful restart in the event of a LDP communication session failure, in accordance with techniques described herein.

FIG. 2 is a block diagram illustrating one exemplary embodiment of a label switching router (LSR) 28 that performs a graceful restart in the event of a LDP communication session failure, in accordance with techniques described herein. For purposes of illustration, LSR 10-3 is described below within the context of the example computer network 2 of FIG. 1. FIG. 2 is described herein with respect to LSR 10-3 of FIG. 1. However, in other examples, LSR 10-3 may be any LSR 10 or other router. Moreover, while FIG. 2 is described with respect to a particular network device, e.g., a router, the techniques may be implemented by any network device that operates according to a label distribution protocol. The techniques should therefore not be limited to the examples described in this disclosure.

LSR 10-3 includes a control unit 30 and a forwarding unit 60. Control unit 30 and forwarding unit 60 receive and send information to a network, such as computer network 2 of FIG. 1, via communication links 50-1 through 50-N and 52-1 through 52-N, respectively. LSR 10-3 further includes interface cards 48-1 through 48-N (collectively referred to herein as "IFCs 48") coupled to control unit 30 via internal links 54-1 through 54-N. N may be any natural number. Communication links 50-1 through 50-N and 52-1 through 52-N are coupled to other routers. For example, communication links 50-1 and 52-1 connect LSR 10-3 to LSR 10-2. Similarly, communication links 50-2 and 52-2 connect LSR 10-3 to LSR 10-5. In other examples, communication links 50-1 through 50-N and 52-1 through 52-N connect LSR 10-3 to other routers, and possible more or less routers than as shown in FIG. 1.

Control unit 30 comprises one or more processors 34 that execute software instructions, such as those used to define a software or computer program. The software instructions are stored in a computer-readable storage medium or memory 36. Examples of a non-transitory computer-readable medium include a storage device such as, a disk drive or an optical drive. Examples of such memory 36 include random access memory (RAM), read-only memory (ROM), non-volatile random access memory (NVRAM), electrically erasable programmable read-only memory (EEPROM), flash memory, and the like. In some examples, memory 36 stores instructions to cause the one or more processors 34 to perform the techniques described herein.

Moreover, the functions of control unit 30 are implemented by executing the instructions of the computer-readable medium with one or more processors, discrete hardware circuitry, firmware, software executing on a programmable processor, or a combination of any of the above. For example, control unit 30 comprises dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 is divided into two logical or physical "planes" to include a first control or routing plane 32A (referred to herein as "control plane 32A") and a second data or forwarding plane 32B (referred to herein as "data plane 32B"). That is, control unit 30 implements two separate functionalities, for example, the routing/control and forwarding/data functionalities, either logically or physically. The two separate functionalities may be implemented logically as separate software instances executing on the same set of hardware components. The two separate functionalities may be implemented physically as separate physical dedicated hardware components that either statically implement the functionality in hardware or dynamically execute software or a computer program to implement the functionality.

Control plane 32A of control unit 30 may execute the routing functionality of router 28. In this respect, control plane 32A may represent hardware or a combination of hardware and software of control unit 30 that may implement a routing protocol, such as an interior gateway protocol (IGP) 44, and a label distribution protocol, such as Label Distribution Protocol (LDP) 40A. IGP 44 establishes routing protocol sessions with peer routers for exchanging routing information stored in a routing information base "RIB" 42. RIB 42 includes information defining a topology of network 6. For example, RIB 42 includes labels that identify routers in computer network 2 of FIG. 1. Control plane 32A resolves the topology defined by routing information in RIB 34 to select or determine one or more routes through computer network 2. LDP 40A establishes peer LDP communication sessions for exchanging labels and FEC mapping information that associate the labels with FECs, e.g., network addresses defined within RIB 42. LDP 40A updates RIB 42 to store the labels from the label mapping message received by LSR 10-3 and associate the labels with the corresponding FECs.

Control plane 32A programmatically updates a forwarding information base (FIB) 64 within data plane 32B to store with forwarding information 62 in accordance with the topology and label mapping information maintained within RIB 42. In some examples, data plane 32B is also referred to herein as a forwarding plane. Forwarding or data plane 32B may represent hardware or a combination of hardware and software of control unit 30 that forwards network traffic in accordance with forwarding information 70. FIB 64 is used in routing networks to store forwarding information 62. In contrast to RIB 42, FIB 64 is used for fast lookup of destination addresses. FIB 64 may, in some aspects, comprise one or more routing instances implemented by LSR 10-3, with each instance including a separate routing table and other routing information. In such aspects, control plane 32A updates forwarding information 62 with forwarding information for each LDP session.

As shown in the example of FIG. 2, processor 34 executes any of a number of protocols for distributing labels. For example, processor 34 executes the Label Distribution Protocol (LDP) 40A or Resource Reservation Protocol (RSVP) 40B to perform auto-discovery and signaling of label mapping information. RSVP, for example, is another scheme for distributing labels for transport LSPs. RSVP includes a mechanism for reserving resources across a network for establishing end-to-end LSPs. Further details of RSVP may be found in "Extensions to RSVP for LSP Tunnels" RFC 3209, The Internet Society (2001), hereby incorporated by reference.

Control unit 30 implements one or more routing protocols, such as IGP 44, to establish at least one communication session for LDP with neighboring routers. For example, referring to FIG. 1, control unit 30 creates LDP session 12 between LSR 10-3 and LSR 10-5. LDP session 12 is used to advertise labels associated with a FEC and capability information regarding supporting graceful restart. For example, control unit 30 may send capability information to LSR 10-5 via LDP session 12 that indicates LSR 10-3 supports, for example, graceful restart, non-stop forwarding, and any other routing capabilities that LSR 10-3 supports. Similarly, LSR 10-5 may send capability information to LSR 10-3 indicating its capabilities, such as support of graceful restart and non-stop forwarding.

In addition to the communication session for LDP, another communication session may be established between LSRs 10 that is used to exchange routing information, such as information that indicates particular routing protocol capabilities supported by each of the routers. A routing protocol, such as IGP 44, is used to establish a routing communication session. LSRs 10-3 and 10-5 exchange routing information with one another in order to learn routes, such as LSPs, through network 6 via IGP 44. Based on the learned routing information, control unit 30 maintains and updates routing information to describe a topology of computer network 2, and more particularly, routes through computer network 2. In some examples, the routing information is stored in FIB 64.

Control unit 30 analyzes the stored routing information of RIB 42 and generates forwarding information 62 for forwarding unit 60. Forwarding information 60 associates, for example, network destinations with specific next hops, FECs, and LSPs. Forwarding unit 60 forwards network traffic via one or more of communication links 52-1 through 52-N in accordance with forwarding information 62 generated by control unit 30. In some examples, forwarding information 62 is received by an IFC 48 from another LSR 10 connected to LSR 10-3. In some examples, forwarding unit 60 comprises a forwarding engine that is responsible for the forwarding functionality of LSR 10-3. Alternatively, forwarding unit 60 distributes the forwarding functionality within one or more interface cards (IFCs).

If LDP session 12 fails, LRS 10-3 performs a graceful restart to continue to forward data packets while LDP session 12 is reestablished. LDP session 12 may fail for a number of reasons, including, among other scenarios, a failure of control unit 30 or of a control unit of LSR 10-5. When a control unit of a router fails, the router is no longer able to connect to the LDP session. However, in some situations, a forwarding unit of the router is still available. For example, if control unit 30 of LSR 10-3 has an error or otherwise fails, LDP session 12 will be lost or "go down." Forwarding unit 60 continues to forward data packets when it is still available. While LDP session 12 is down, forwarding unit 60 forwards data packets according to the labels previously stored in FIB 64 (also referred to herein as "old labels"). That is, control unit 30 preserves forwarding information 62 in a state that existed prior to failure of LDP session 12. However, while LDP session 12 is down, old labels are marked as stale. Forwarding unit 60 proceeds to forward network traffic in accordance with the preserved forwarding information 62 until a label mapping message is received defining new labels in a reestablished LDP session 12. In this manner, LSR 10-3 supports, for example, non-stop forwarding of network traffic.

Similarly, during the period of failure of LDP session 12, LSR 10-5 maintains LSR 10-3 in their forwarding paths and continue to forward network traffic to LSR 10-3. Generally, techniques of the disclosure enable routers connected to a failed or restarting router to maintain the failed router within their forwarding paths and continue to forward traffic to the failed router. For example, if control unit 30 of LSR 10-3 fails, any LDP session that included LSR 10-3 will have also failed. In addition to LDP session 12 going down, if LSR 10-3 had another LDP session with LSR 10-2, the LDP session between LSR 10-3 and LSR 10-2 will have gone down. Thus, LSR 10-2 and LSR 10-5 maintain LSR 10-2 in their forwarding paths while the LDP sessions are down. Maintaining LSR 10-3 in the forwarding path of peer routers may reduce problems associated with routing flaps, such as intermittent loss of network connectivity as well as increased packet loss and latency. Similarly, if the failure of LDP session 12 was caused by LSR 10-5 instead of LSR 10-3, LSR 10-3 maintains LSR 10-5 in its forwarding path and continue to forward traffic to LSR 10-5.

Upon reestablishing LDP session 12 with LSR 10-5, control unit 30 again exchanges capability information with LSR 10-5 in some examples. Control unit 30 sends a label request message to LSR 10-5. Upon reestablishing LDP session 12, control unit 30 receives and process routing communications from LSR 10-5 to obtain updated routing information, such as new labels. After receiving updated routing information from LSR 10-5, control unit 30 updates forwarding information 62. More specifically, control unit 30 removes "stale" entries, i.e., entries preserved in a state that existed prior to failure of LDP session 12, of forwarding information 60. Additionally, LSR 10-5 updates its respective forwarding information in a similar manner. The communication session continues as normal.

Thus, LSR 10-3 may gracefully reestablish one or more LDP communication sessions using downstream on demand label distribution mechanisms based upon a failure of a control unit. LDP 40A provides graceful restart for LDP communication sessions using downstream on demand label distribution mechanisms based on a number of factors, such as network topology, whether the LDP communication sessions all use DOD, or whether the LDP communication sessions use a hybrid of DOD and DU label distribution mechanisms.

FIG. 3A-3G are block diagrams illustrating example graceful restart procedures based on a position of a failed router in the network topology, in accordance with techniques described herein. The examples in FIGS. 3A-3G correspond with the network topology of computer network 2 of FIG. 1. Thus, for purposes of these examples, the routers shown in FIGS. 3A-3G are routers of FIG. 1 and are discussed from the perspective of LSP 14 of data packet 18. However, in other examples, techniques described herein may apply to other routers joined with different network topology. FIGS. 3A-3G are simplified versions of FIG. 1, wherein a single transit router exists between ingress router 10-1 and egress router 10-N. The techniques discussed herein are extendable to more complicated networks.

The techniques for graceful restart procedures for downstream on demand LDP sessions may vary based on network topology and which router fails. FIG. 3A-3G illustrate some example scenarios but are not intended to cover every possible situation. For purposes of these examples, each LSR has an LDP session established between itself and a neighboring LSR. One of the LDP sessions goes down due to a failure of one of the LSRs. The network undergoes a graceful restart and continues to forward network traffic while the LDP session that went down is reestablished.

Generally, an upstream LSR will request a label mapping message from a downstream router when the DOD LDP communication session failed, when the LSRs support graceful restart. Normal LDP procedures follow a restart and a forwarding state is preserved until a recovery timer is expired.

Figure 3A:
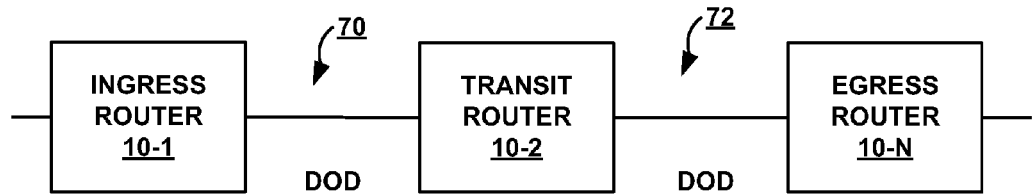
FIG. 3A-3G are block diagrams illustrating example graceful restart procedures based on a position of a failed router in the network topology, in accordance with techniques described herein.

FIG. 3A illustrates an example where a graceful restart is performed after failure of a downstream on demand LDP session, in accordance with techniques described herein. From the perspective of a data packet, such as data packet 20, ingress router 10-1 is upstream of transit router 10-2, which is in turn upstream of egress router 10-N. For purposes of this example, each of ingress router 10-1, transit router 10-2, and egress router 10-N are label switching routers. A downstream on demand LDP session 70 is established between ingress router 10-1 and transit router 10-2. A downstream on demand LDP session 72 is established between transit router 10-2 and egress router 10-N. In some examples, there may be another router between transit router 10-2 and egress router 10-N.

Each router 10 has labels from a label mapping stored in its forwarding information, which identify other routers in computer network 2. Ingress router 10-1 receives data packets for forwarding through computer network 2 and forwards the data packets according to the forwarding information.

First, FIG. 3A is discussed in terms of ingress router 10-1 failing. When ingress router 10-1 fails, for example, from a failure of a control unit, LDP session 70 goes down. Ingress router 10-1 may restart. The labels previously stored in the routing information are marked as stale. Once ingress router 10-1 restarts, LDP session 70 is reestablished. Ingress router 10-1 sends transit router 10-2 a discovery message, which is used to announce and maintain the presence of an LSR in a network, in order to reestablish LDP session 70.

Ingress router 10-1 sends transit router 10-2 a label request message. Ingress router 10-1 begins a recovery timer. As used herein, a recovery time objective (RTO) is the maximum tolerable length of time that a router 10 or an LDP session can be down after a failure or disaster occurs. The recovery timer defines a specific amount of time a router or LDP session may be down, such as, for example, 120 seconds. In some examples, the recovery timer is started upon reestablishment of LDP session 70, when ingress router 10-1 sends the label request message, or at another time. The labels are marked as stale in the forwarding state at approximately a time of starting the recovery timer. While LDP session 70 is down, and before ingress router 10-1 receives new labels, ingress router 10-1 continues to forward data packets to transit router 10-2 according to the stale labels.

Transit router 10-2 receives the label request message from ingress router 10-1. In response, transit router 10-2 provides ingress router 10-1 with new labels by sending a new label mapping message to ingress router 10-1. The new labels reflect any topology changes to the computer network since ingress router 10-1 failed. After receiving the label mapping message from transit router 10-2, ingress router 10-1 clears the stale labels from the forwarding state. If one or more labels in the label mapping message are the same as the old labels, ingress router 10-1 clears the stale mark from the old label in the forwarding state. For any labels that are different from the old labels, ingress router 10-1 installs the new label in its forwarding state.

In some examples, if the recovery timer expires before ingress router 10-1 receives a label mapping message from transit router 10-2, ingress router 10-1 deletes its forwarding state. When the forwarding state is empty, ingress router 10-1 no longer continues forwarding data packets based on the old labels. When a new label mapping message is received, ingress router 10-1 creates a new forwarding state based on the new labels from the label mapping message.

It may be that the labels in the label mapping message for the reply to label request message are the same labels as before ingress router 10-1 restarted, if the downstream router supports the use of the same labels even after restart. However, they may be different labels. In some examples where the new labels are different than the old labels, the downstream router, in this case transit router 10-2, maintains two labels for the same FEC until the recovery timer expires. Transit router 10-2 deletes the old label after expiration of the recovery timer.

The forwarding state is preserved when an LSR, such as ingress router 10-1, restarts. A recovery timer is started, either at ingress router 10-1 or transit router 10-2, and all forwarding state labels are marked as stale. At the expiration of the recovery timer, all labels still marked as stale are deleted.

Next, the graceful restart technique for when transit router 10-2 fails is discussed with respect to FIG. 3A. For purposes of this discussion, transit router 10-2 is directly connected to egress router 10-N. As shown in FIG. 3A, LDP sessions 70 and 72 are both downstream on demand LDP sessions. After transit router 10-2 restarts, ingress router 10-1 sends a label request message to transit router 10-2. Transit router 10-2 propagates the label request message to egress router 10-N. Responsive to receiving the label request message, egress router 10-N sends a label mapping message to transit router 10-2. Transit router 10-2 forwards the label mapping message to ingress router 10-1. Any stale marks in the forwarding state of the routers 10-1 and 10-2 are cleared. In some examples, procedures similar to those described above with respect to the ingress router 10-1 failure are followed.

Figure 3B:
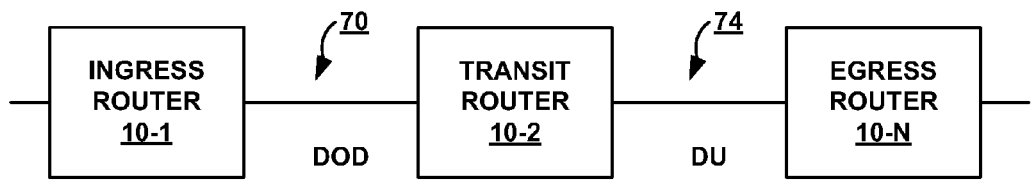

Turning to FIG. 3B, an example scenario where a graceful restart is performed after failure of a transit router is illustrated. In FIG. 3B, a downstream on demand LDP session 70 is established between ingress router 10-1 and transit router 10-2. A downstream unsolicited LDP session 74 is established between transit router 10-2 and egress router 10-N. In this example, transit router 10-2 fails. Once ingress router 10-1 determines that transit router 10-2 has restarted, perhaps by receiving a hello or discovery message from transit router 10-2, and then after re-establishing LDP session 70 between ingress router 10-1 and transit router 10-2, ingress router 10-1 sends a label request message to transit router 10-2. However, because LDP session 74 is downstream unsolicited, transit router 10-2 has to wait for an unsolicited label mapping message to be sent to transit router 10-2 from egress router 10-N instead of sending a label mapping request. In contrast, ingress router 10-1 sends a label request message to transit router 10-2 because LDP session 70 between ingress router 10-1 and transit router 10-2 is downstream on demand LDP session. Once transit router 10-2 receives an unsolicited label mapping message from egress router 10-N, transit router 10-2 forwards the unsolicited label mapping message to ingress router 10-1. At this time, any stale marks in the forwarding state are cleared.

Figure 3C:

FIG. 3C provides an example scenario where a graceful restart is performed after failure of a transit router, according to techniques described herein. In this example, an LDP session 76 between ingress router 10-1 and transit router 10-2 is downstream unsolicited. Similar to FIG. 3A above, LDP session 72 connects transit router 10-2 and egress router 10-N and is downstream on demand. In this example, transit router 10-2 acts as an ingress and a midpoint of computer network 2.

When transit router 10-2 fails, transit router 10-2 sends a label request to egress router 10-N. Transit router 10-2 is configured to send a label mapping message from DOD LDP session 72 to DU LDP session 76. Transit router 10-2 responds with the label mapping message to ingress router 10-1 only after receiving the label mapping message from egress router 10-N. Any stale marks in the forwarding state are cleared.

Figure 3D:
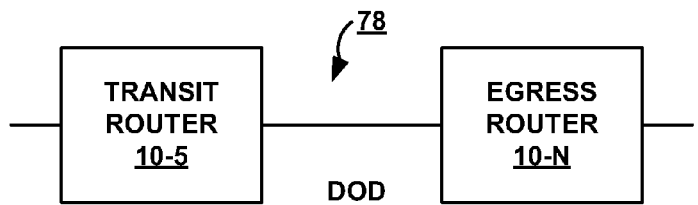

FIG. 3D provides an example scenario where a graceful restart is performed after failure of an egress router, according to techniques described herein. An LDP session 78 is established between transit router 10-5 and egress router 10-N. LDP session 78 is a downstream on demand LDP session. In this scenario, egress router 10-N restarts. Because LDP 78 is DOD, transit router 10-5 sends egress router 10-N a label request message. If a FEC identified in the label request message is configured as egress at egress router 10-N, egress router 10-N sends a label mapping message to transit router 10-5. Any stale marks on labels in the forwarding state are cleared.

Figure 3E:
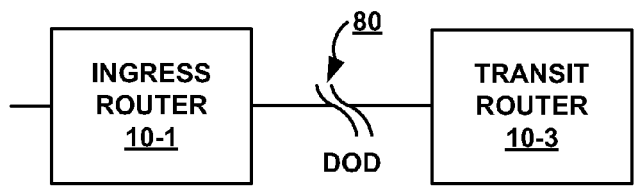
Figure 3F:
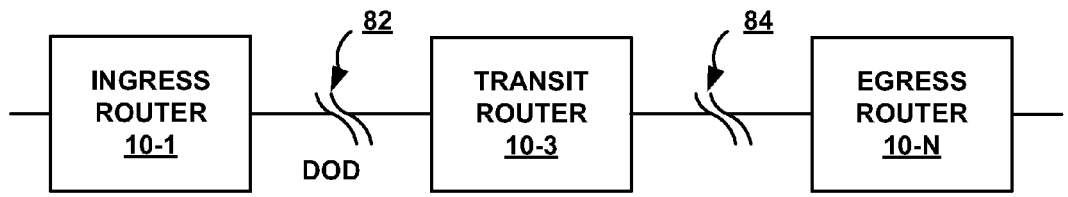
Figure 3G:
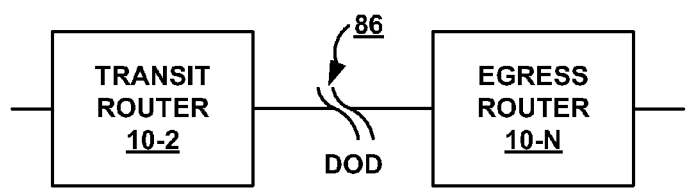

FIGS. 3E-3G illustrate examples where a helper LSR assists a faulting LSR in graceful restart, in accordance with the disclosed techniques. As defined herein, a helper LSR is a remote neighboring LSR of the faulted LSR that assists the faulted LSR in the graceful restart. A remote neighbor LSR to a second LSR is any LSR that is not directly connected to the second LSR via a data link. The helper LSR retains all FEC-to-label mappings learned from the restarting, faulted LSR. The helper LSR marks the forwarding state as stale and start a restart timer. While the restart timer is running, the helper LSR waits for the LDP session to reestablish and continues to use the stale forwarding information. If the restarting LSR does not reestablish the LDP session before the expiration of the restart timer, the helper LSR immediately deletes the stale labels in the forwarding state. However, if the restarting LSR manages to reestablish the LDP session on time, the helper LSR cancels the restart timer and processes the newly received graceful restart capability. In some examples, a reconnect timer on a helper LSR may be started while the LDP session is reestablished.

In FIG. 3E, ingress router 10-1 is coupled to transit router 10-3 via a DOD LDP communication session 80. In some examples, other LRSs may be between ingress router 10-1 and transit router 10-3, such as transit router 10-2 of FIG. 1. In this example, ingress router 10-1 acts as a helper LSR. Once ingress router 10-1 discovers transit router 10-3 has restarted, ingress router 10-1 marks all LDP labels received from transit router 10-3 as stale. Ingress router 10-1 re-requests the labels by sending a label request message to transit router 10-3 after reestablishing DOD LDP session 80. After receiving a label mapping message including new labels from transit router 10-3, ingress router 10-1 clears the stale marks.

FIG. 3F illustrates an example where a graceful restart is assisted by a transit helper LSR 10-3, in accordance with techniques described herein. If transit router 10-3 detects that ingress router 10-1 is restarting, transit router 10-3 marks all LDP labels sent to ingress router 10-1 as stale and waits for a label request message from ingress router 10-1. If there is no label request from ingress router 10-1 even after expiration of a recovery timer, then transit router 10-3 sends a label release message to a downstream router, such as egress router 10-N if LDP session 84 with egress router is DOD. Transit router 10-3 deletes the state in the forwarding path. If LDP session 84 between transit router 10-3 and egress router 10-N is downstream unsolicited, transit router 10-3 deletes the forwarding state if there are no other upstream LDP sessions at egress router 10-N.

FIG. 3G illustrates an example where a graceful restart is assisted by an egress helper LSR 10-N, in accordance with techniques described herein. If egress router 10-N detects that transit router 10-2 is restarting, egress router 10-N marks all labels previously received from and sent to transit router 10-2 as stale. Egress router 10-N waits for a label request message from transit router 10-2. If egress router 10-N receives a label request from transit router 10-2, egress router 10-N resends a label mapping message to transit router 10-2 and clears any stale marks in the forwarding path.

Thus, through these procedures, graceful restart can be achieved for downstream on demand LDP communication sessions.

Figure 4:
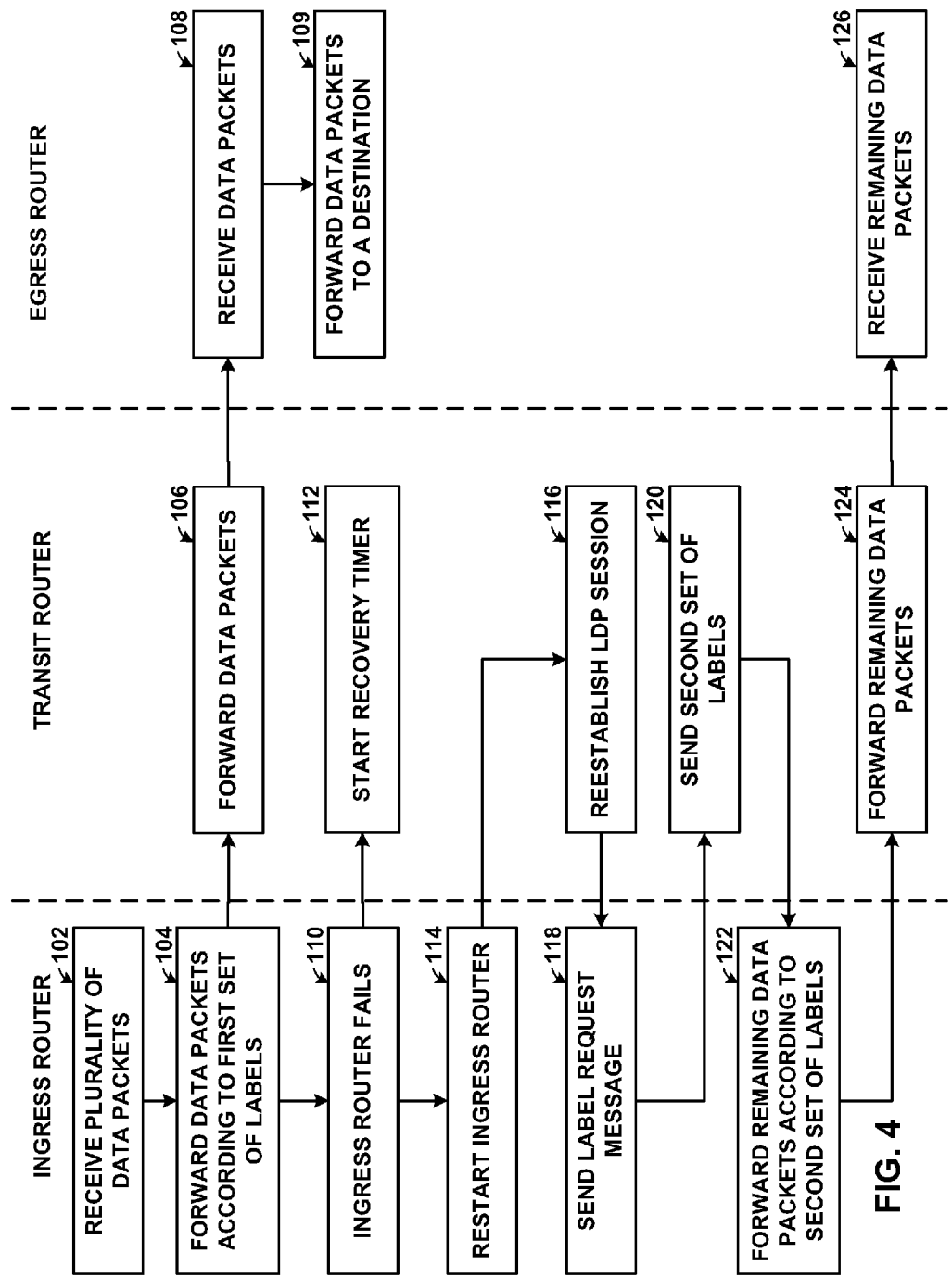
FIG. 4 is a flow diagram illustrating an example operation of a network reestablishing an LDP communication session employing downstream on demand label distribution mechanisms with graceful restart, in accordance with techniques described herein.

FIG. 4 is a flow diagram illustrating an example operation of a network reestablishing an LDP communication session employing downstream on demand label distribution mechanisms with graceful restart, in accordance with techniques described herein. FIG. 4 depicts an ingress router, a transit router, and an egress router. These routers may be LSRs 10 of FIG. 1, similar to LSR 10-3 of FIG. 2, and function similar to the LSRs described with respect to FIGS. 3A-3G. As described herein, the ingress router is upstream of the transit router, which is in turn upstream of an egress router, with respect to a label switching path.

A first communication session for label distribution protocol (LDP) is established between the ingress router and the transit router. A second communication session for label distribution protocol (LDP) is established between the transit router and the egress router. That is, a communication session for LDP is established between an upstream router and a downstream router, wherein the downstream router is downstream of the upstream router with respect to a destination of a plurality of data packets. An upstream router, such as the ingress router receives a first label mapping message from a downstream router, such as the transit router, via the first communication session. The first label mapping message includes a first set of labels that identifies how to forward one or more data packets.

The ingress router receives a plurality of incoming data packets (102) and begins forwarding some of the packets according to the first set of labels from the first label mapping message (104). The transit router receives the data packets and forwards them onward to the egress router, according to label stored in a forwarding state of the transit router (106). The egress router receives the data packets (108) and forwards them onto the destination (109).

In the example of FIG. 4, a control unit of the ingress router fails (110). If a router itself has an error and restarts, it will know the communication session has failed. In contrast, a router that has not failed may detect a failure of a communication session due to the connected router by a selected time period elapsing in which the router does not receive a discovery message from the LSR it is connected to over the communication session. For example, an upstream router sends a first discovery message to a downstream router once for approximately every first time interval. Likewise, the downstream router sends a second discovery message to the upstream router once for approximately every second time interval. In some examples, the first and second time intervals have approximately the same duration. A failure of a communication session is detected when either the downstream router does not receive the first discovery message for more than approximately the first time interval or when the upstream router does not receive the second discovery message for more than approximately the second time interval.

The failure of the communication session is detected by at least the transit router, which starts a recovery timer (112). One or more labels from the first label mapping are marked as stale in a forwarding state of the transit router. Once the recovery timer expires, the one or more labels marked as stale are deleted. In other examples, the ingress router starts a recovery timer upon restart. The ingress router continues to forward data packets according to previously stored labels in a forwarding state of the ingress router until the recovery timer expires.

Once the ingress router fails, it is restarted, which may occur automatically (114). The LDP session is reestablished between the ingress router and the transit router (116). In one example, the LDP session is reestablished once the transit router detects that the ingress router is back online. When the ingress router is restarted and back online, it sends one or more discovery messages to neighboring routers. The transit router determines that the ingress router is back online when it receives a discovery message from the ingress router. Either the ingress router or the transit router initiates reestablishment of the LDP session.

Once the LDP session is reestablished, the ingress router sends a label request message to the transit router via the reestablished LDP session (118). The ingress router will send the label request message when the LDP communication session employs downstream on demand label distribution mechanisms. Before the ingress router receives new labels, it continues to forward some data packets according to the first set of labels.

Responsive to receiving the label request message, the transit router determines new labels and sends a label mapping message identifying those labels to the ingress router (120). In some examples, the transit router requests labels from a downstream router, such as the egress router, which the transit router then forwards to the ingress router. The second label mapping message includes a second set of labels that identifies how to forward at least a second data packet of the plurality of data packets in the reestablished communication session.

Once the ingress router has the second set of labels, it replaces any previous labels in the forwarding state with the second set of labels. The ingress router forwards any remaining data packets according to the second set of labels (122). The transit router receives the remaining data packets and forwards them to the egress node (124). The egress node receives the remaining data packets and forwards them to the destination (126).

In some examples, the transit router automatically sends a label mapping message to the ingress router. In some examples, the second label mapping is the same as the first label mapping.

In general, techniques have been described for reducing the impact of failure of a label switching router. In particular, techniques are described for performing a graceful restart for a multiprotocol label switching (MPLS) computer network that utilizes labels according to the Label Distribution Protocol (LDP). Graceful restart reduces the impact of a failure a routing communication session, which are sometimes the result of a failure of one or more LSRs within the MPLS network. Techniques described herein enable a graceful restart of a routing communication session for LDP that is operates using downstream on demand label distribution.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (for example, in RAM or cache).

Various aspects of the disclosure have been described. Aspects or features of examples described herein may be combined with any other aspect or feature described in another example. These and other embodiments are within the scope of the following claims.

The invention claimed is:

1. A method, comprising:
   establishing a communication session for a Label Distribution Protocol (LDP) between an upstream router and a downstream router, wherein the communication session is using a downstream on demand label distribution mechanism for distributing labels between routers;
   requesting, by the upstream router, a first label mapping from the downstream router, wherein the downstream router is downstream of the upstream router with respect to a label switched path (LSP) to a destination of a plurality of data packets;
   receiving, by the upstream router, the first label mapping message from the downstream router via the communication session, wherein the first label mapping message includes at least a first label to be applied by the upstream router as an outer label when forwarding the plurality of data packets along the LSP to the destination;

forwarding, by the upstream router, at least a first data packet of the plurality of data packets along the LSP to the destination, the first data packet having the first label as an outer label;

responsive to detecting, with the upstream router, a failure of the communication session due to failure of the downstream router, forwarding, by the upstream router, at least a second data packet of the plurality of data packets along the LSP to the destination by continuing to use the first label as an outer label for at least the second data packet while the communication session is failed;

reestablishing the communication session for LDP between the upstream router and the downstream router while preserving a forwarding state for at least the first label as an outer label for forwarding the data packets along the LSP to the destination; and responsive to determining that the downstream router has restarted and that the communication session for LDP has been reestablished, requesting, by the upstream router, a second label mapping message from the downstream router via the reestablished communication session, wherein the second label mapping message includes at least a second label to be applied by the upstream router when forwarding at least a third data packet of the plurality of data packets to the destination in the reestablished communication session.

2. The method of claim 1, wherein the failure of the communication session is based on a failure of the downstream router, the method further comprising:

receiving, by the upstream router, a discovery message from the downstream router after the downstream router restarts; and responsive to receiving the discovery message, determining, by the upstream router, that the downstream router has restarted.

3. The method of claim 1, further comprising:

receiving, by the upstream router, the second label mapping message from the downstream router; and forwarding, by the upstream router, at least the third data packet of the plurality of data packets according to at least the second label.

4. The method of claim 1, wherein the first label is the same as the second label.

5. The method of claim 1, further comprising:

responsive to detecting the failure, starting a recovery timer;

marking, in the forwarding state of the upstream router, the first label as stale; and deleting, upon expiration of the recovery timer, the first labels marked as stale.

6. The method of claim 5, further comprising:

ceasing to forward the one or more data packets according to the first label from the first label mapping message after the recovery timer expires.

7. The method of claim 1, wherein detecting a failure of the communication session further comprises:

sending, by the upstream router, a first discovery message to the downstream router once for approximately every first time interval;

sending, by the downstream router, a second discovery message to the upstream router once for approximately every second time interval; and determining a failure has occurred when the upstream router does not receive the second discovery message for more than approximately the second time interval.

8. A network device, comprising:

an interface card;

a routing control unit having one or more processors that establishes a routing communication session with a peer label switching router (LSR) in accordance with a routing protocol, wherein the routing communication session that uses a downstream on demand label distribution mechanism for distributing labels between routers, wherein the peer LSR is downstream of the network device with respect to a label switched path (LSP) to a destination of a plurality of data packets, and wherein the routing control unit is configured to receive a first label mapping message comprising at least a first label to be applied by the network device as an outer label when forwarding at least a first data packet of the plurality of data packets along the LSP to the destination, detect a failure of the routing communication session due to failure of the downstream peer LSR, responsive to determining that the downstream peer LSR has restarted and that the communication session for LDP has been reestablished, reestablish the routing communication session between the network device and the peer LSR while preserving a forwarding state for at least the first label as an outer label for forwarding the data packets along the LSP to the destination, send a label request to the peer LSR requesting a label mapping message responsive to the detected failure, and receive a second label mapping message comprising at least a second label to be applied by the network device when forwarding at least a second data packet of the plurality of data packets to the destination; and a forwarding unit that preserves the forwarding state of the first label while the routing communication session is failed, and forwards at least the first data packet along the LSP while the routing communication session is failed and forwards any remaining data packets of the plurality of data packets along the LSP according to the second label once the routing communication session is reestablished.

9. The network device of claim 8, further comprising:

a memory, wherein the memory stores the first label from the first label mapping in the forwarding state while the routing communication session is failed.

10. The network device of claim 8, wherein the routing protocol is a Label Distribution Protocol (LDP).

11. The network device of claim 8, wherein the forwarding unit is configured to, responsive to the routing communication session failure, mark the first label in the forwarding state as stale, and responsive to receiving the second label mapping message, deleting the first label marked as stale.

12. The network device of claim 11, further comprising a recovery timer that begins approximately upon failure of the routing communication session, wherein the first label marked as stale is deleted upon expiration of the recovery timer.

13. A tangible non-transitory computer-readable medium comprising instructions for causing a programmable processor to perform operations comprising:

establishing a communication session for a Label Distribution Protocol (LDP) between an upstream router and a downstream router, wherein the communication session is using a downstream on demand label distribution mechanism for distributing labels between the upstream router and the downstream router;

requesting, by the upstream router, a first label mapping from the downstream router, wherein the downstream router is downstream of the upstream router with respect to a label switched path (LSP) to a destination of a plurality of data packets;

receiving, by the upstream router, the first label mapping message from the downstream router via the communication session, wherein the first label mapping message includes at least a first label to be applied by the upstream router as an outer label when forwarding the plurality of data packets to the destination;

forwarding, by the upstream router, at least a first data packet of the plurality of data packets along the LSP to the destination, the first data packet having the first label as an outer label;

responsive to detecting, with the upstream router, a failure of the communication session due to failure of the downstream router, forwarding, by the upstream router, at least a second data packet of the plurality of data packets along the LSP to the destination by continuing to use the first label as an outer label for at least the second data packet while the communication session is failed reestablishing the communication session for LDP between the upstream router and the downstream router while preserving a forwarding state for at least the first label as an outer label for forwarding the data packets to the destination; and responsive to determining that the downstream router has restarted and that the communication session for LDP has been reestablished, requesting, by the upstream router, a second label mapping message from the downstream router via the reestablished communication session, wherein the second label mapping message includes at least a second label to be applied by the upstream router when forwarding at least a third data packet of the plurality of data packets to the destination in the reestablished communication session.

14. The tangible non-transitory computer-readable medium of claim 13, wherein the failure of the communication session is based on a failure of the downstream router, the instructions further comprising:

receiving, by the upstream router, a discovery message from the downstream router after the downstream router restarts; and responsive to receiving the discovery message, determining, by the upstream router, that the downstream router has restarted.

* * * * *